(12) United States Patent
Mohan et al.

(10) Patent No.: US 11,796,086 B2
(45) Date of Patent: Oct. 24, 2023

(54) INSTALLATION OF SUBSEA PIPELINES

(71) Applicants: Subsea 7 (US) LLC, Houston, TX (US); Shell International Exploration and Production Inc., Houston, TX (US); Total E&P Research & Technology USA, LLC, Houston, TX (US)

(72) Inventors: Karthik Mohan, Houston, TX (US); Ilkay Darilmaz, Houston, TX (US); Khalid Mateen, Katy, TX (US)

(73) Assignee: Subsea 7(US) LLC, Houston, TX (US)

( * ) Notice: Subject to any disclaimer, the term of this patent is extended or adjusted under 35 U.S.C. 154(b) by 0 days.

(21) Appl. No.: 17/289,679

(22) PCT Filed: Oct. 27, 2019

(86) PCT No.: PCT/US2019/058244
§ 371 (c)(1),
(2) Date: Apr. 28, 2021

(87) PCT Pub. No.: WO2020/092182
PCT Pub. Date: May 7, 2020

(65) Prior Publication Data
US 2021/0348698 A1    Nov. 11, 2021

(30) Foreign Application Priority Data

Oct. 29, 2018   (GB) ...................................... 1817656

(51) Int. Cl.
*F16L 1/16*         (2006.01)
*F16L 1/235*        (2006.01)
(Continued)

(52) U.S. Cl.
CPC ............... *F16L 1/163* (2013.01); *F16L 1/235* (2013.01); *B63B 21/66* (2013.01); *B63B 35/03* (2013.01); *F16L 1/205* (2013.01)

(58) Field of Classification Search
CPC .............. F16L 1/163; F16L 1/235; F16L 1/24
See application file for complete search history.

(56) References Cited

U.S. PATENT DOCUMENTS 375,464 A      12/1887   Thacher et al.
3,331,212 A *   7/1967   Cox ....................... B63H 25/00
                                                405/168.1
(Continued)

FOREIGN PATENT DOCUMENTS

GB       1 434 357      5/1976
GB       2 144 700      8/1983
(Continued)

*Primary Examiner* — Sean D Andrish
(74) *Attorney, Agent, or Firm* — Levy & Grandinetti

(57) ABSTRACT

A method of installing a subsea pipeline supports at least one elongate pipe stalk at the surface of the sea at a first, relatively shallow-water location by virtue of buoyancy added to the pipe stalk. The pipe stalk is then towed at the surface to a second location that is in deeper water. There, with the pipe stalk supported between leading and trailing towing vessels, at least some of the added buoyancy is removed. This causes the pipe stalk to hang with catenary curvature beneath the surface between the vessels. The catenary-curved pipe stalk hanging between the vessels is then towed to a third location for subsea installation, which may involve upending the pipe stalk before landing a lower end portion of it on the seabed.

16 Claims, 5 Drawing Sheets

(51) Int. Cl.
    *B63B 21/66*    (2006.01)
    *B63B 35/03*    (2006.01)
    *F16L 1/20*     (2006.01)

(56) References Cited

U.S. PATENT DOCUMENTS

| | | | |
|---|---|---|---|
| 3,656,310 | A | 4/1972 | Brun et al. |
| 4,786,207 | A | 11/1988 | Morton et al. |
| 4,810,133 | A | 3/1989 | Kopp et al. |
| 6,082,391 | A * | 7/2000 | Thiebaud .............. E21B 17/012 |
| | | | 405/224.1 |
| 9,944,358 | B2 | 4/2018 | Viellard |
| 2008/0112763 | A1 | 5/2008 | Pollack et al. |
| 2011/0286802 | A1* | 11/2011 | Persson ..................... F16L 1/24 |
| | | | 405/224.2 |
| 2017/0146152 | A1* | 5/2017 | Goodlad ................. F16L 1/163 |
| 2017/0292246 | A1* | 10/2017 | Lazzarin ............... E02F 9/2866 |

FOREIGN PATENT DOCUMENTS

| | | |
|---|---|---|
| GB | 2 153 318 | 8/1985 |
| GB | 2 426 496 | 11/2006 |
| GB | 2522197 | 7/2015 |
| WO | WO 01/96771 | 12/2001 |
| WO | WO 2016/001680 | 1/2016 |

\* cited by examiner

INSTALLATION OF SUBSEA PIPELINES

BACKGROUND OF THE INVENTION

This invention relates to the installation of pipelines underwater, for example as used in the subsea oil and gas industry.

Installing subsea pipelines often requires the use of large and expensive pipelaying vessels. Such vessels navigate above an installation site on the seabed while launching the pipeline, usually far offshore. Optionally, such vessels also assemble the pipeline offshore from distinct pipe elements, such as in S-lay and J-lay operations where a pipeline is fabricated from a succession of pipe joints.

Specialist pipelaying vessels are valuable capital assets that are extremely expensive to operate and are in high demand globally. It is therefore desirable to reduce dependency upon such vessels to install subsea pipelines. Pipelaying vessels that suspend a pipe string between the surface and the seabed may also encounter top-tension limitations when pipelaying in deep and ultra-deep water.

One approach to reduce the size and cost of an installation vessel involves pre-assembling a pipeline or pipeline bundle onshore and then transporting the pipeline or bundle across the sea to an installation site at which it is lowered to the seabed. In view of the limited length of the pipeline or bundle that can be transported, some extra connection operations may be required to achieve a desired installed length. An ancient example of this technique is disclosed in U.S. Pat. No. 375,464. Here, pipes are kept afloat alongside a boat by buoyancy that is removed to sink the pipes before the pipes are connected in shallow water.

Longer pipes or bundles, assembled in stalks, can also be floated, towed at the surface and lowered for subsea connection, as exemplified in U.S. Pat. No. 3,656,310. A drawback of this approach is the need to remove or reduce buoyancy at the installation site. This takes time on the critical path and hence ties up installation assets and increases cost. Even if some buoyancy remains attached to the pipe stalk to reduce top tension and so to allow a less expensive vessel to be used for installation, the slowness of the buoyancy removal operation negates any resulting cost saving.

Another drawback of surface towing is the fatigue that is experienced by the pipe stalk when floating at the surface because of its exposure to sea dynamics such as heave and waves. This limits the distance over which the pipe stalk can be towed in a given sea state and, conversely, the sea state in which towing over a given distance is permissible.

In view of these drawbacks, various techniques have been developed to tow a pipeline underwater. For example, the pipeline of GB 2114700 is supported by buoys whereas the pipeline of GB 2426496 is so light that no extra buoyancy is required. In each case, the pipeline adopts a humped, reverse-catenary shape during towing. However, clump weights are needed when lowering the pipeline onto the seabed, which also takes time on the critical path for connection and disconnection. There is also a risk of wire rupture when pulling the pipeline to a pre-installed subsea structure to which the pipeline is to be connected for fluid communication.

In U.S. Pat. No. 4,810,133, a tendon for a tension leg platform is assembled offshore, wet-stored on the seabed, recovered for towing as a catenary between two tugs and then installed. The tendon does not have any added buoyancy. In addition to needing an offshore pipe assembling system, wet storage can jeopardize the condition of a pipeline.

In WO 01/96771, a pipeline fitted with buoyancy tubes is designed to adopt a catenary shape while floating in mid-water, without hold-back tension being applied by tugs.

In U.S. Pat. No. 2008/112763, pipe sections are connected in series on a vessel to form a pipe string that is pulled out by a tug boat, and subsequently lowered to the sea floor.

GB 2153318 describes a method of towing a pipeline structure. The structure is suspended between two tugs, and weights attached at points along its length are subject to hydrodynamic lift forces during towing.

GB 1434357 describes a method of towing a pipe section between two vessels, in which floats having adjustable buoyancy are provided along its length to allow the depth of the pipe section below the surface of the water to be controlled.

BRIEF SUMMARY OF THE INVENTION

Against this background, the invention provides a method of installing a subsea pipeline. The method comprises: at a first, relatively shallow-water location, supporting at least one elongate pipe stalk at the surface of the sea by virtue of buoyancy added to the pipe stalk; towing the pipe stalk at the surface to a second location that is in deeper water; with the pipe stalk supported between leading and trailing towing vessels at the second location, removing at least some of the added buoyancy so that the pipe stalk hangs with catenary curvature beneath the surface between the towing vessels; and towing the catenary-curved pipe stalk hanging between the towing vessels to a third location for subsea installation.

When hanging with t curvature, the pipe stalk may extend to a depth beneath the surface that is greater than the depth of the sea at the first location.

At the second location, the added buoyancy may be removed from a longitudinally inner region of the pipe stalk before the added buoyancy is removed from longitudinally outer regions of the pipe stalk that are outboard of the inner region.

The added buoyancy may be removed substantially simultaneously from the outer regions or may be removed from the outer regions in alternation.

The method of the invention may further comprise: upending the pipe stalk at the third location by lowering one end of the pipe stalk relative to the other end of the pipe stalk; detaching one of the towing vessels from the lower end of the upended pipe stalk; and suspending the upended pipe stalk from the other towing vessel.

The lower end of the pipe stalk may then be connected to a subsea installation that is pre-installed on the seabed, to enable fluid communication between the pipe stalk and the subsea installation. Before connecting the pipe stalk to the subsea installation, a minor lower end portion of the upended pipe stalk may be placed on the seabed while continuing to suspend a major portion of the pipe stalk above the seabed. After connecting the pipe stalk to the subsea installation, the major portion of the pipe stalk may be laid on the seabed. The lower end of the upended pipe stalk may be pulled toward the subsea installation.

Removing buoyancy from the pipe stalk may involve removing at least some buoyancy modules that were attached to the pipe stalk, or flooding at least some buoyancy modules that are attached to the pipe stalk.

Preferably, substantially all of the added buoyancy is removed from the pipe stalk when allowing the pipe stalk to hang with catenary curvature.

The pipe stalk may be assembled on a vessel that floats on the surface, or may be assembled on land and pulled into the sea.

The pipe stalk is suitably landed on the seabed at the first location before being raised to, and supported at, the surface. For example, the pipe stalk may be raised from the seabed to the surface by deballasting buoyancy modules that are attached to the pipe stalk.

At least two pipe stalks may be joined together before towing them together from the first location to the second location or from the second location to the third location.

Embodiments of the invention provide a method for installing an underwater pipeline, the method comprising the following steps: manufacturing at least one pipeline stalk; floating at least partially the pipeline stalk at water surface in a first location, in shallow water, wherein extra buoyancy is connected to the pipeline stalk; towing the pipeline stalk to a second location in deeper water with at least one leading tug; if only one tug was used for initial towing, connecting a trailing tug to the pipeline stalk; removing all extra buoyancy from the pipeline so that the pipeline adopts a catenary configuration at a water depth below the surface between the two tugs; and towing the pipeline stalks to a third location for final installation.

Multiple pipeline stalks may be towed simultaneously. Manufacturing may be done offshore by a pipelay vessel, or onshore.

Final installation may comprise: releasing one tug so that a first end of the pipeline stalk sinks to the seabed under its weight; releasing a second tug and lowering the second end by a winch to a pre-determined depth, which may be the depth of the seabed; and connecting the first end to a pre-installed pipeline connector. The step of releasing one tug so that a first end of the pipeline stalk sinks to the seabed under its weight may comprise releasing one end of the pipeline by paying out winch wire on the trailing tug, and using the weight of the pipeline to lower the stalk end in the water column.

The pipeline connector may be any of: a collet connector; a pinbox connector (also known as a pin-and-box connector); a bell-and-spigot connector; or a threaded connector.

In summary, installing a subsea pipeline in accordance with the invention comprises supporting at least one elongate pipe stalk at the surface of the sea at a first, relatively shallow-water location by virtue of buoyancy added to the pipe stalk. The pipe stalk is then towed at the surface to a second location that is in deeper water.

Extra buoyancy may be removed from the pipeline stalk by first removing central buoyancy, then going from the centre to the ends, simultaneously or separately.

At least some, and preferably most or all, of the added buoyancy is removed when the pipe stalk is supported between leading and trailing towing vessels at the second location. This causes the pipe stalk to hang with catenary curvature beneath the surface between the vessels. The catenary-curved pipe stalk hanging between the vessels is then towed to a third location for subsea installation. Installation may involve upending the pipe stalk before landing a lower end portion of it on the seabed, and then connecting the lower end to a pre-installed subsea installation such as a pipeline.

BRIEF DESCRIPTION OF THE SEVERAL VIEWS OF THE DRAWINGS

In order that the invention may be more readily understood, reference will now be made, by way of example, to the accompanying drawings in which.

DETAILED DESCRIPTION OF THE INVENTION

Figure 1:
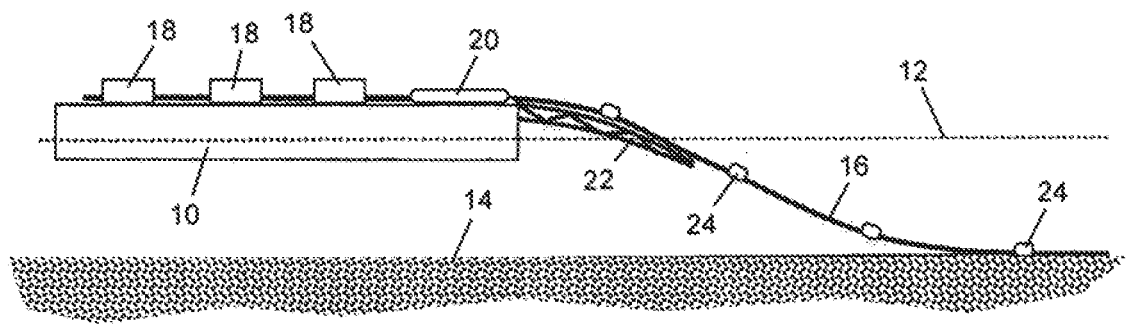
FIG. 1 is a schematic side view of a pipelaying barge fabricating and laying a pipe stalk on the seabed in shallow water.

FIG. 1 shows a barge or other pipelaying vessel 10 on the surface 12 of the sea, floating above the seabed 14 while laying a pipe stalk 16. The pipe stalk 16 is shown here being laid in shallow water; for example, the vessel 10 may be at an inshore location, close to hand. Shallow water is typically understood to mean depths less than 100 m; however, it should be understood that in this case 'shallow' and 'deep' are relative, terms, and 'shallow' water may be any depth that is shallower than the 'deeper' waters referred to later in the description.

In this example, the vessel 10 is configured conventionally for S-lay operations. Thus, the pipe stalk 16 is fabricated from a succession of rigid steel pipe joints on board the vessel 10. The pipe joints are welded together end-to-end and the welds are tested and coated at a series of workstations 18. A tensioner system 20 grips the pipe stalk 16 to support the length of the pipe stalk 16 that is suspended between the vessel 10 and the seabed 14. As pipe joints are added, the lengthening pipe stalk 16 is launched into the sea over a stinger 22 and is then landed on the seabed 14 as the vessel 10 advances across the surface 12.

Buoyancy modules 24 are distributed along the length of the pipe stalk 16 in a longitudinal array with mutual longitudinal spacing. At least some of the buoyancy modules 24 have variable buoyancy, for example having floodable internal chambers that, when collectively flooded with sea water, confer negative buoyancy on the overall assembly of the pipe stalk 16 and the buoyancy modules 24. Thus, flooding at least some of the buoyancy modules 24 in this way ensures that the pipe stalk 16 will sink to the seabed 14 when it is launched from the vessel 10 over the stinger 22, as shown in FIG. 1.

Figure 2:
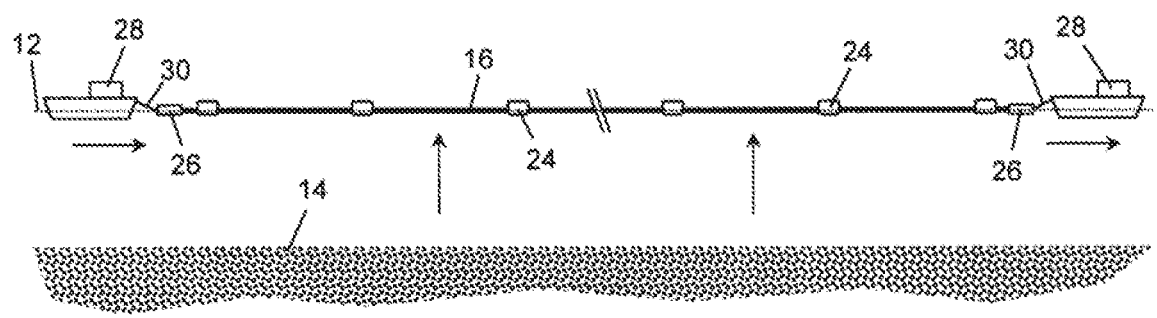
FIG. 2 is a schematic side view of the pipe stalk raised from the seabed to the surface and being towed away from shallow water while being supported by towing vessels and by buoyancy.

FIG. 2 shows that the completed pipe stalk 16 further comprises sub-sea-operable mechanical connectors 26 at its opposite ends. The connectors 26 may, for example, be of the collet, pinbox, bell-and-spigot or threaded type. The connectors 26 allow the pipe stalk 16 to be coupled to other subsea equipment or installations, such as a pre-installed pipeline as will be explained below with reference to FIGS. 5a to 5c.

When the entire pipe stalk 16 has been fabricated and laid on the seabed 14 as shown in FIG. 1, the ends of the pipe stalk 16 are then coupled to respective towing vessels 28 via winch cables 30 as shown in FIG. 2. The towing vessels 28 hold the pipe stalk 16 in tension between them.

When completed, the pipe stalk 16 is typically from 1 km to 3 km or more in length. A pipe stalk 16 of that length can be towed and lowered onto the seabed 14 by small, non-specialised towing vessels 28, such as anchor-handling tugs, without requiring added buoyancy. An advantage of the invention is therefore that it provides a cost-effective alternative to conventional pipeline installation and reduces top tension when installing pipelines in deep and ultra-deep water depths (for example, at depths of greater than 100 m).

FIG. 2 shows the pipe stalk 16 lifted clear of the seabed 14 at a first location to allow the pipe stalk 16 to be towed to a second location in deeper water (i.e. deeper than the water at the first location) without dragging on the sea bed. Preferably, substantially the entire length of the pipe stalk 16 extends substantially horizontally across the surface 12 as shown in FIG. 2. For this purpose, the pipe stalk 16 is deballasted, for example by injecting air into the flooded buoyancy modules 24 to displace water from them. Thus, the pipe stalk 16 is supported in the elevated position shown in FIG. 2 partially by tension in the cables 30 but mainly by the longitudinally-distributed positively-buoyant upthrust of the buoyancy modules 24.

When the towing vessels 28 have towed the pipe stalk 16 to a second location in sufficiently deep water, buoyancy is removed progressively as shown in FIGS. 3a to 3e to allow the pipe stalk 16 to assume catenary curvature in tension under its own weight. In this example, buoyancy is removed by removing the buoyancy modules 24 from the pipe stalk 16. However, buoyancy could instead be removed from the pipe stalk 16 by flooding at least some of the buoyancy modules 24, if those modules have variable buoyancy as mentioned above.

Various types of buoyancy modules 24 could be used, such as inflatable buoyancy units as sold by Unique Group under the trade mark Seaflex®, in conjunction with a suitable release mechanism. For example, buoyancy modules 24 could be released from the pipe stalk 16 by couplings that are responsive to acoustic commands emitted underwater. Buoyancy modules 24 could instead be released by subsea intervention, for example by ROVs.

Figure 3A:
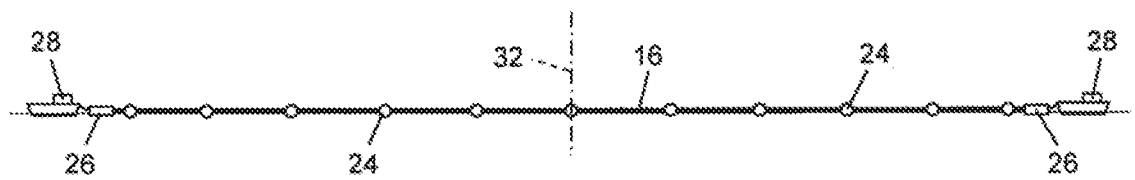
FIGS. 3a to 3e are a sequence of schematic side views that show the pipe stalk in deeper water and being lowered into a catenary configuration by removal of buoyancy while being suspended from the towing vessels.
Figure 3B:
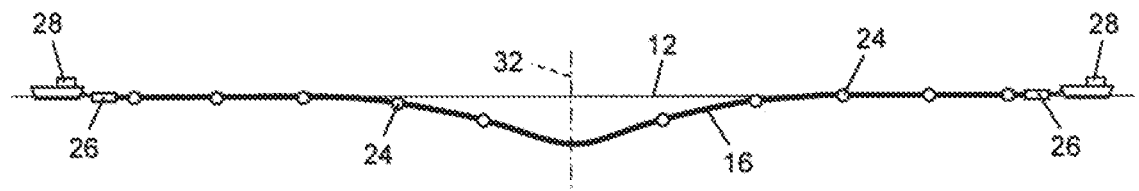
Figure 3C:
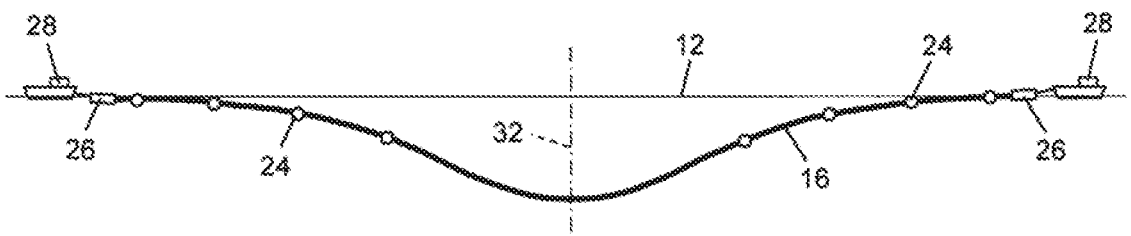
Figure 3D:
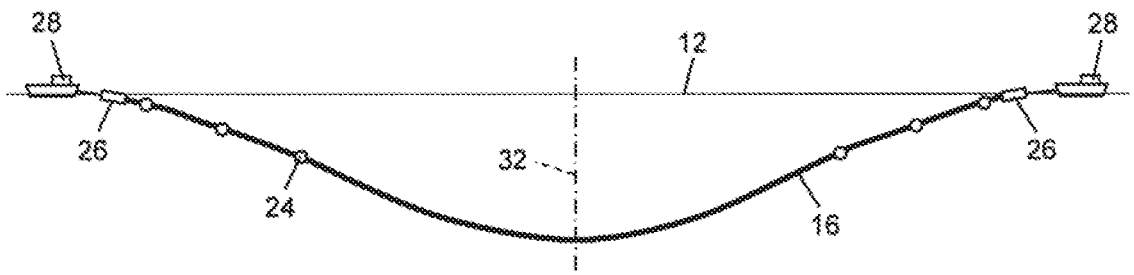

Initially, buoyancy modules 24 disposed centrally with respect to the length of the pipe stalk 16 are removed to submerge the longitudinally central portion of the pipe stalk 16 as shown in FIGS. 3b, 3c and 3d.

To balance loads and to control the curvature of the pipe stalk 16, buoyancy is removed in mirror image from opposite sides of a longitudinally central plane 32. Preferably, buoyancy is removed from both sides of the central plane 32 at substantially the same time. However, it would be possible instead to remove buoyancy from both sides of the central plane 32 in alternation.

As more buoyancy modules 24 are removed progressively from the pipe stalk 16, moving outwardly along the longitudinal array in opposite longitudinal directions from the central plane 32, the central portion of the pipe stalk 16 slumps and submerges to a greater depth beneath the surface 12. The pipe stalk 16 remains substantially symmetrical about the central plane 32.

The central portion of the pipe stalk 16 hangs beneath and between the opposed ends of the pipe stalk 16, which remain supported by the remaining longitudinally-outward buoyancy modules 24. The buoyancy modules 24 that remain attached to the pipe stalk 16 stay conveniently close to the surface 12 to ease their removal or flooding, as the case may be.

Figure 3E:
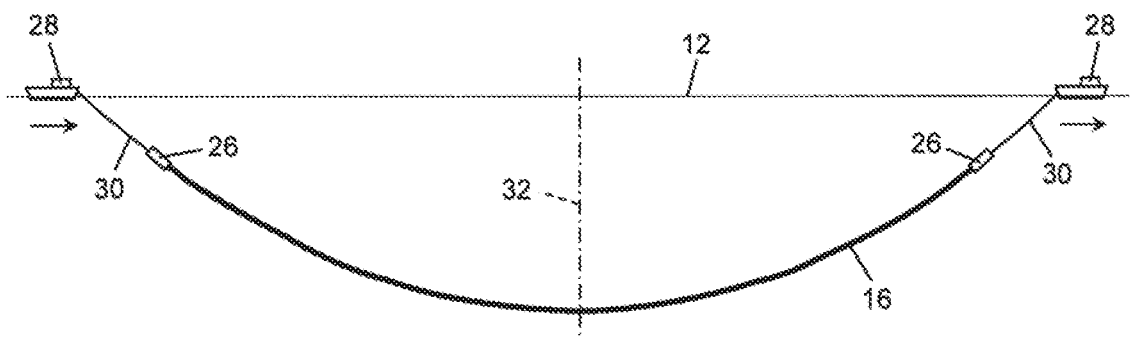

Eventually, as shown in FIG. 3e, buoyancy modules 24 are removed from, or flooded along, the full length of the pipe stalk 16. Now substantially devoid of added buoyancy, the pipe stalk 16 now hangs as a catenary from the towing vessels 28 via the cables 30. Next, the towing vessels 28 resume towing the pipe stalk 16 to an installation site as shown in FIG. 3e.

As the pipe stalk 16 bends as shown in FIGS. 3b to 3e, the horizontal distance between its opposed ends decreases. Consequently, the towing vessels 28 pay out the cables 30 as shown; alternatively, the towing vessels 28 may move closer together on the surface 12.

Advantageously, removing buoyancy between the shallow-water and deeper-water towing phases takes the process of buoyancy removal off the critical path. This shortens the overall installation process and hence enables a significant cost reduction and better use of available weather windows.

During the remainder of the towing operation, the pipe stalk 16 is kept in tension and is suspended at a depth at which it is less susceptible to sea dynamics near the surface 12. This reduces fatigue loads experienced by the pipe stalk 16 and so greatly increases the distance over which the pipe stalk 16 may be towed in a given sea state.

Figure 4A:
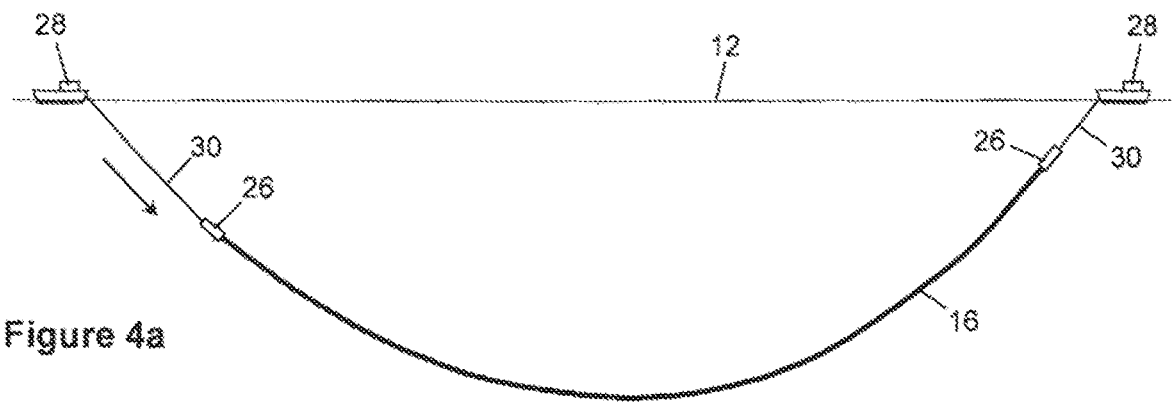
FIGS. 4a to 4c are a sequence of schematic side views that show the load of the pipe stalk being transferred to one of the towing vessels during an upending operation.
Figure 4B:
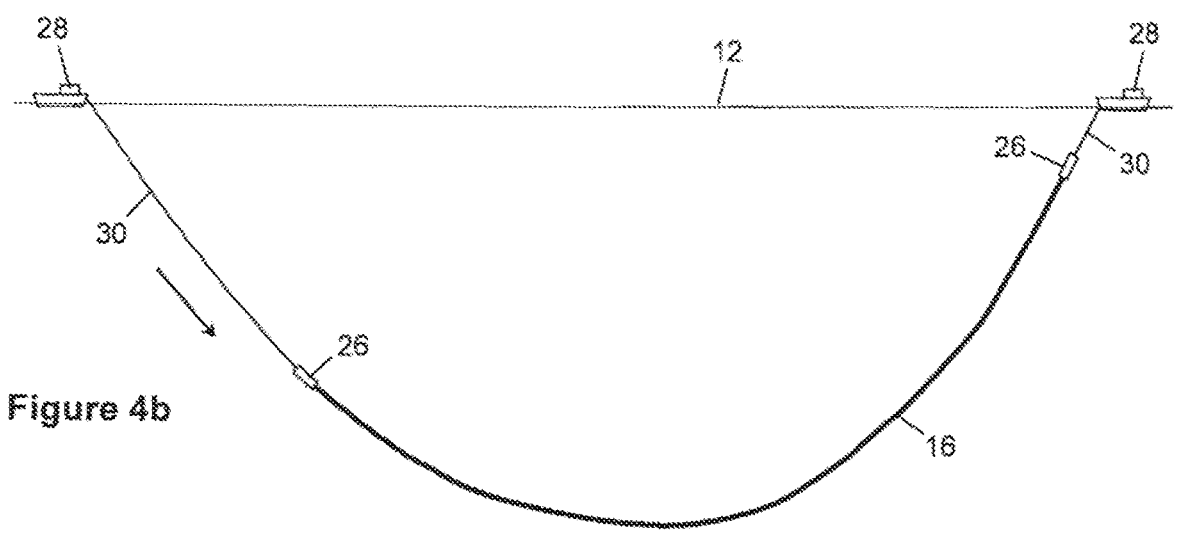
Figure 4C:
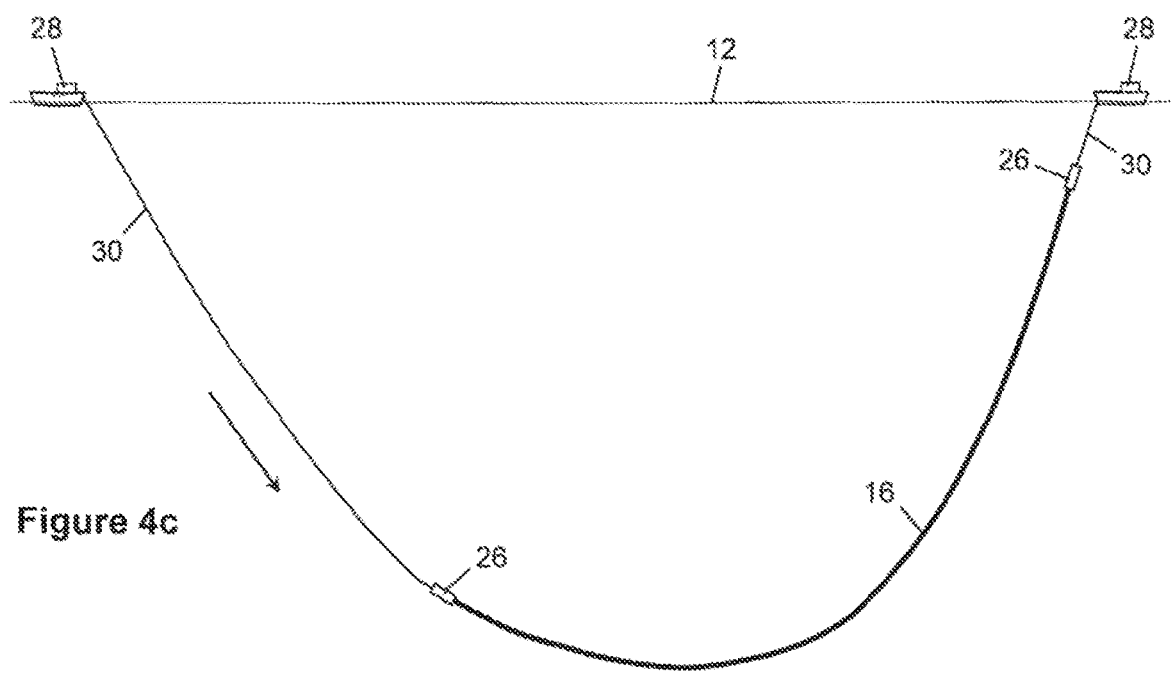
Figure 5A:
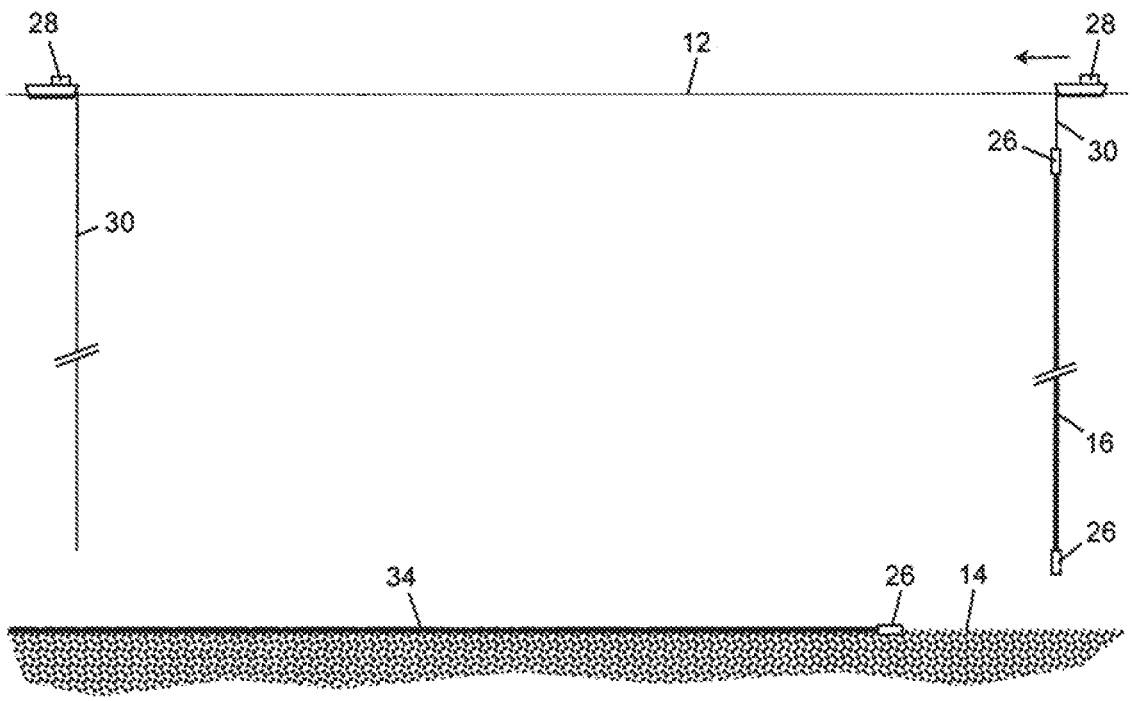
FIGS. 5a to 5c are a sequence of schematic side views that show the upended pipe stalk suspended from one of the towing vessels and being coupled to a pipeline pre-installed on the seabed.

On reaching a third location above or near to the installation site, the pipe stalk 16 is upended. To do so, one of the towing vessels 28 pays out its cable 30, which skews the pipe stalk 16 laterally toward the other towing vessel 28 as shown in FIGS. 4a to 4c. Eventually, the lengthened cable 30 goes slack as the entire load of the pipe stalk 16 is transferred to the other towing vessel 28. The lengthened cable 30 is then detached from its end of the pipe stalk 16 as shown in FIG. 5a, for example using an ROV or a remotely-operable coupling. As a result, the pipe stalk 16 is suspended substantially vertically in the water column beneath the other towing vessel 26 and with the lower end of the pipe stalk 16 held above the seabed 14.

FIG. 5a shows a pre-installed subsea installation, in this example a pipeline 34, lying on the seabed 14 at the installation site. The pipe stalk 16 is to be coupled to the pipeline 34 for fluid communication between them. In this respect, it will be noted that the pipeline 34 has a connector 26 at its end that complements and is co-operable with the connectors 26 at the ends of the pipe stalk 16. This effects fluid communication between the pipe stalk 16 and the pipeline 34 when their connectors 26 are coupled together. FIG. 5a also shows the towing vessel 28 that supports the pipe stalk 16 moving across the surface 12 to carry the pipe stalk 16 toward the connector 26 at the end of the pipeline 34.

Figure 5B:
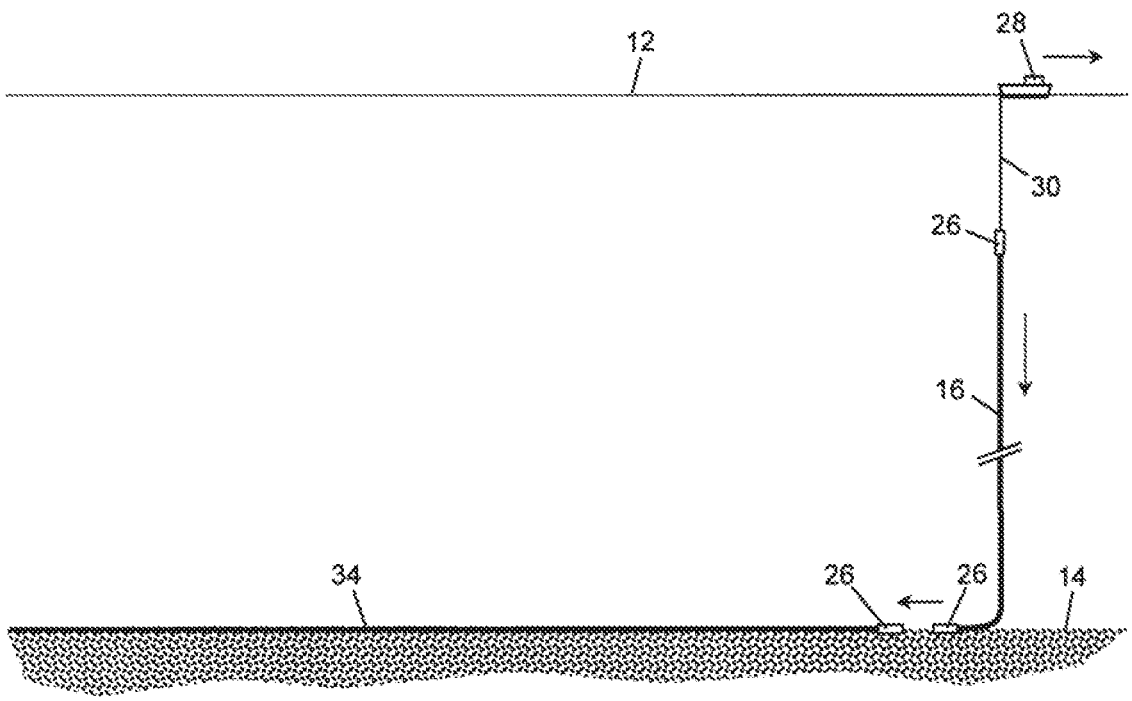
Figure 5C:
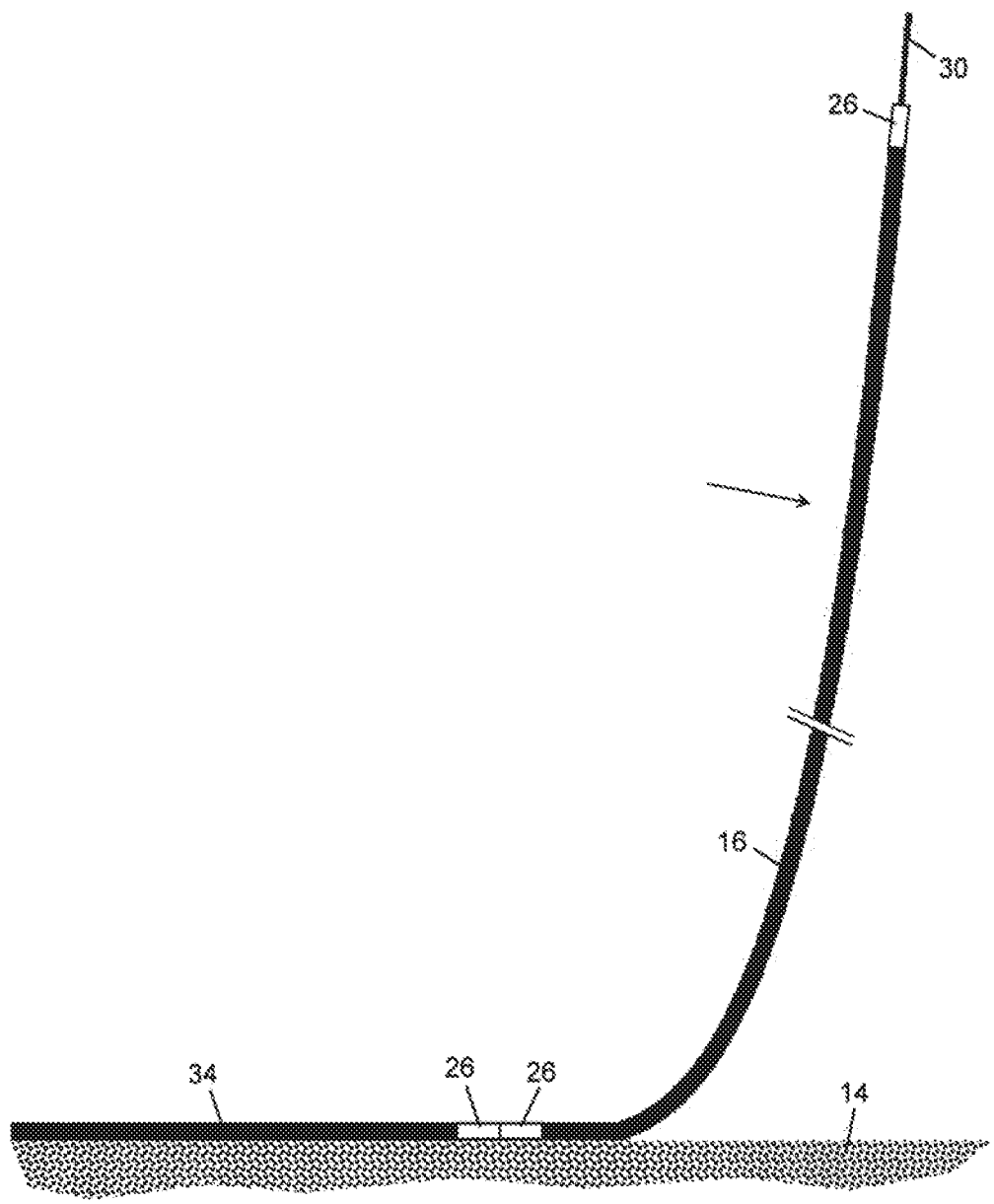

Next, as shown in FIG. 5b, the pipe stalk 16 is lowered so that its lower end is landed on the seabed 14 close to the connector 26 at the end of the pipeline 34. This stabilises the pipe stalk 16 and so prevents it swaying in the water column. The connector 26 at the lower end of the pipe stalk 16 faces, and is pulled into engagement with, the connector 26 at the end of the pipeline 34. With fluid communication thus established, the pipe stalk 16 can then be laid down on the seabed 14 in end-to-end relation with the pipeline 34, hence extending the length of the pipeline 34. FIG. 5c is an enlarged view that shows the pipe stalk 16 in the process of being laid down on the seabed 14. Additional pipe stalks 16 can be added in a similar manner to lengthen the pipeline 34 further.

Many variations are possible without departing from the inventive concept. For example, elongate subsea elements other than a plain pipe stalk, such as a pipe bundle, could also be transported and installed in accordance with the invention.

A pipe stalk or other elongate subsea element could be fabricated onshore, such as at a spoolbase, and pulled into an adjacent body of water before being raised to the surface and towed into deeper water.

A pipe stalk or other elongate element need not be of steel or of rigid configuration. For example, a pipe stalk or other elongate element could be flexible or of composite material.

Two or more pipe stalks or other elongate elements could be laid on the seabed and joined end-to-end, for example using mechanical connectors. The conjoined pipe stalks or other elongate elements may then be raised from the seabed for towing out from shallow water and then hung in a catenary configuration when in deeper water. The possibility of towing multiple pipe stalks in this manner depends upon the bollard pull that is available from the towing vessels. For example, assessment has shown that it would be possible to tow two pipe stalks of eight-inch pipeline (about 20 cm in diameter) simultaneously, each pipe stalk being 2 km long.

Ballasting could involve flooding of variable-buoyancy elements, removal of buoyancy elements and/or attachment of weights such as clump weights or chains along the length of the pipe stalk or other elongate element. Deballasting could involve expelling water from variable-buoyancy elements, attaching buoyancy elements to the pipe stalk or other elongate element or detaching weights such as clump weights or chains from the pipe stalk or other elongate element.

If a pipeline or other elongate element to be installed is light enough to present a risk of being positively buoyant, such as composite pipeline, weights such as clump weights or chains could be added to the pipeline to ensure negative buoyancy. Another approach to reduce buoyancy is to change a coating on a pipeline or other element, either by increasing the volume of a dense and negatively buoyant coating or by reducing the volume of a positively buoyant coating.

Some buoyancy could remain attached to a pipe stalk or other elongate element, especially near its ends, when sufficient buoyancy has been removed to confer negative buoyancy on the assembly as a whole.

When a pipe stalk or other elongate element is supported buoyantly in shallow water, it would be possible to tow it using only a single, leading towing vessel. In that case, a second, trailing towing vessel can be coupled to the trailing end before the pipe stalk or other element is lowered into the catenary configuration for the next phase of towing in deeper water.

The invention claimed is:

1. A method of installing a subsea pipeline comprises:
   at a first location, supporting at least one elongate pipe stalk at a surface of a sea by virtue of buoyancy added to the at least one pipe stalk;
   towing the at least one pipe stalk at the surface to a second location that is in deeper water than the first location;
   removing at least some of the added buoyancy so that the at least one pipe stalk hangs with catenary curvature beneath the surface between leading and trailing towing vessels, wherein the at least some of the added buoyancy is removed progressively from a central portion of the at least one pipe stalk before longitudinally outer regions of the at least one pipe stalk that are outboard of the inner region, so that the central portion of the at least one pipe stalk is submerged to a greater depth beneath the surface than end portions of the at least one pipe stalk and the at least one pipe stalk is substantially symmetrical about a plane disposed at a longitudinally central position between the towing vessels; and
   wherein the at least some of the added buoyancy is removed from the central portion and the longitudinally outer regions of the at least one pipe stalk while the at least one pipe stalk is supported between the towing vessels at the second location; and
   after removing the at least some of the added buoyancy from the central portion and the longitudinally outer regions of the at least one pipe stalk so that the at least one pipe stalk hangs with catenary curvature beneath the surface between the towing vessels, towing the at least one pipe stalk hanging with catenary curvature between the towing vessels to a third location for subsea installation.

2. The method of claim 1, wherein the added buoyancy is removed substantially simultaneously from the outer regions.

3. The method of claim 1, wherein the added buoyancy is removed from the outer regions in alternation.

4. The method of claim 1, further comprising:
   upending the at least one pipe stalk at the third location by lowering one end of the at least one pipe stalk relative to another end of the at least one pipe stalk;
   detaching one of the towing vessels from the lower end of the upended at least one pipe stalk; and
   suspending the upended at least one pipe stalk from the other towing vessel.

5. The method of claim 4, further comprising connecting the lower end of the upended at least one pipe stalk to a subsea installation that is pre-installed on the seabed, to enable fluid communication between the upended at least one pipe stalk and the subsea installation.

6. The method of claim 5, further comprising:
   before connecting the upended at least one pipe stalk to the subsea installation, placing a minor lower end portion of the upended at least one pipe stalk on the seabed while continuing to suspend a major portion of the upended at least one pipe stalk above the seabed; and
   after connecting the upended at least one pipe stalk to the subsea installation, laying the major portion of the upended at least one pipe stalk on the seabed.

7. The method of claim 5, comprising pulling in the lower end of the upended at least one pipe stalk toward the subsea installation.

8. The method of claim 1, comprising removing the added buoyancy from the at least one pipe stalk by removing at least some buoyancy modules that were attached to the at least one pipe stalk.

9. The method of claim 1, comprising removing the added buoyancy from the at least one pipe stalk by flooding at least some buoyancy modules that are attached to the at least one pipe stalk.

10. The method of claim 1, comprising removing substantially all of the added buoyancy from the at least one pipe stalk when allowing the at least one pipe stalk to hang with catenary curvature.

11. The method of claim 1, wherein when hanging with catenary curvature, the at least one pipe stalk extends to a depth beneath the surface that is greater than the depth of the sea at the first location.

12. The method of claim 1, wherein the at least one pipe stalk is assembled on a vessel that floats on the surface.

13. The method of claim 1, wherein the at least one pipe stalk is assembled on land and pulled into the sea.

14. The method of claim 1, wherein the at least one pipe stalk is landed on the seabed at the first location before being raised to, and supported at, the surface.

15. The method of claim 14, wherein the at least one pipe stalk is raised from the seabed to the surface by deballasting buoyancy modules attached to the at least one pipe stalk.

16. The method of claim 1, comprising joining one of the at least one pipe stalks to another of the at least one pipe stalks to form a conjoined pipe stalk before towing the conjoined pipe stalk from the first location to the second location or from the second location to the third location.

\* \* \* \* \*